No. 887,812. PATENTED MAY 19, 1908.
F. JOHNSON.
AMUSEMENT DEVICE.
APPLICATION FILED APR. 27, 1907.
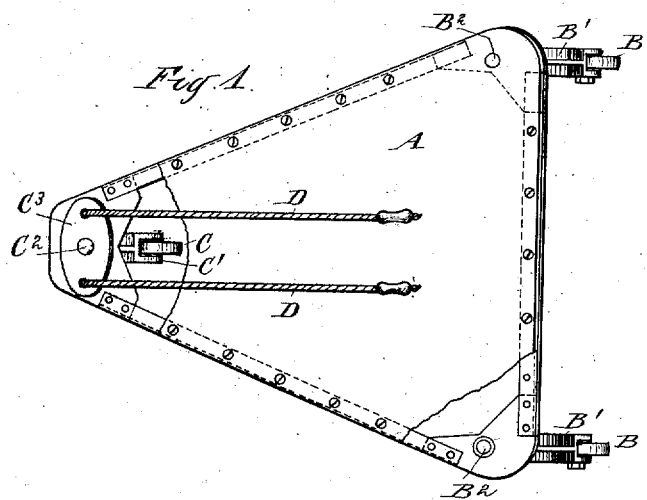
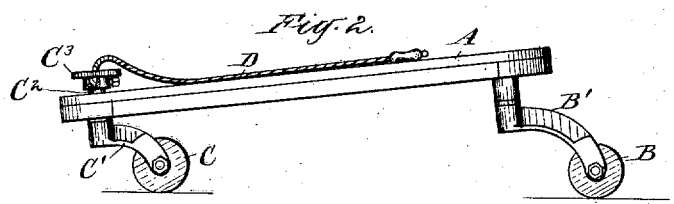
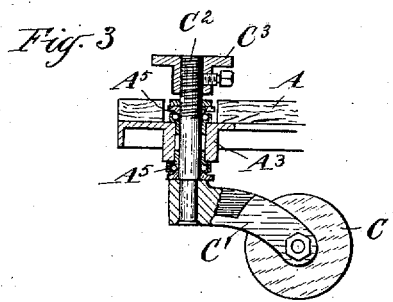 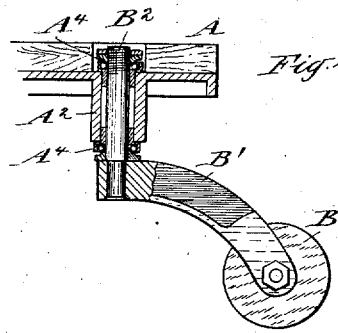
WITNESSES:
F. J. Greene
H. J. Petersen
INVENTOR
Frank Johnson,
BY
Charles R. Searle
ATTORNEY

UNITED STATES PATENT OFFICE.

FRANK JOHNSON, OF NEW YORK, N. Y.

AMUSEMENT DEVICE.

No. 887,812.      Specification of Letters Patent.      Patented May 19, 1908.

Application filed April 27, 1907. Serial No. 370,546.

*To all whom it may concern:*

Be it known that I, FRANK JOHNSON, a citizen of the United States, residing in the city of New York, borough of Brooklyn, in the county of Kings and State of New York, have invented a certain new and useful Improvement in Amusement Devices, of which the following is a specification.

The invention relates to vehicles or wheeled machines in which a platform supported on casters is propelled by the movements of an operator standing thereon, and the object of the invention is to provide an easily operated machine of this character, requiring skill and muscular activity in its propulsion and management, thus affording healthful exercise and harmless amusement.

The invention consists in certain novel features and details of construction by which the above objects are attained, to be hereinafter described.

The accompanying drawings form a part of this specification and show a preferred form of the invention.

Figure 1 is a plan or top view of the machine, certain portions of the platform being shown as broken away to show the parts beneath. Fig. 2 is a side view. Fig. 3 is a side view, partly in vertical section, showing the front or steering caster and adjacent portions, on a larger scale. Fig. 4 is a corresponding view of one of the rear or driving casters.

Similar letters of reference indicate the same parts in all the figures.

As illustrated in the drawings the machine comprises a platform A which may be wood, preferably triangular in form with a plane upper face, mounted upon three swiveling casters located one at each angle. The platform is inclined downwardly from one edge or base line at the rear, toward the opposite angle at the front, and is strengthened by a framework of metal beneath in which are tubular lugs or sockets each projecting downwardly at a right angle to the plane of the platform, and each carrying antifriction bearings in which the spindle or shank of one of the casters is received.

B B are the rear or driving caster wheels mounted as usual in downwardly-curved laterally-extending stocks $B^1$ $B^1$, and $B^2$ $B^2$ are the upwardly projecting cylindrical spindles secured in the stocks and received in the ball-bearings $A^4$ $A^4$ mounted axially in the sockets $A^2$ $A^2$ so that these casters can swivel as usual.

The front or steering caster wheel C is similarly journaled in a shorter and lower stock $C^1$ having a longer spindle $C^2$ extending through the platform A and rotating in ball-bearings $A^5$ $A^5$ in the front socket $A^3$. On the upper end of the spindle $C^2$ is secured a yoke or tiller-head $C^3$ having cords or tiller ropes D attached to its ends, by which steering caster may be turned or swung to control the direction of its travel and thus guide the machine.

The operator stands upon the platform facing toward the front with the tiller-ropes in his hands, and by swaying movements of his body to shift the center of gravity alternately from side to side in a manner somewhat analogous to a skating motion, the rear portion of the machine is caused to swing alternately to the left and right and induces a general forward movement of the machine, the direction of which may be controlled by the steering caster through the tiller-ropes.

The effort to maintain an upright position and to propel the machine and also to guide it successfully requires skilful balancing, in attaining which the muscles are exercised, and much amusement afforded both to the operator and spectators.

Importance is attached to the inclination of the platform. My experiments indicate that the machine thus arranged is propelled with less effort than is required to move one in which the platform is horizontally disposed; this difference is believed to be due to the tendency of the operator on the inclined form to throw the center of gravity further to the rear, thus causing the rear or driving casters to carry a greater proportion of the load and therefore to work more effectually.

By mounting the spindles of the casters in ball-bearings and with their axial lines perpendicular to the plane of the platform, the friction of these relatively moving parts is lessened.

The laterally extending stock $C^1$ of the steering wheel C permits the side to side oscillations of the driving casters and rear portion of the platform to take place about the spindle $C^2$ without materially changing the direction of the steering caster, thus facilitating the work of guiding the machine.

I claim:—

1. In a machine of the character set forth, a platform inclined downwardly from the rear portion toward the front portion, driving casters supporting said rear portion, a steering caster supporting said front portion, and cords for controlling the direction of travel of said steering caster.

2. In a machine of the character set forth, a triangular platform inclined downwardly from a line forming the base of a triangle at the rear portion toward the opposite angle at the front portion, casters supporting said rear portion, a steering caster supporting said front portion, and cords for controlling the direction of travel of said steering caster.

3. In a machine of the character set forth, a platform inclined downwardly from the rear portion toward the front portion, sockets on said platform, at the front and rear, the spindles of the rear casters being longer than those of the front and casters supporting said platform, the spindles of said casters received in said sockets and held therein with their axial lines perpendicular to the plane of said platform.

4. In a machine of the character set forth, a triangular platform inclined downwardly from a line forming the base of the triangle at the rear portion of said platform to the opposite angle at the front portion, sockets on said platform, one of said sockets located at each angle thereof, driving casters supporting said rear portion, a steering caster supporting said front portion, antifriction bearings in said sockets, the spindles of said casters received in said bearings with the axial lines thereof perpendicular to the plane of said platform, a tiller-head on the spindle of said steering caster, and tiller-ropes attached to said tiller-head, whereby the direction of travel of said steering caster is controlled.

In testimony that I claim the invention above set forth I affix my signature, in presence of two witnesses.

FRANK JOHNSON.

Witnesses:
 CHARLES R. SEARLE,
 F. E. ECCARDT.